Oct. 4, 1966  J. W. FITZGERALD ET AL  3,277,436
HOLLOW ELECTRO-ACOUSTIC TRANSDUCER
Filed Feb. 9, 1956  2 Sheets-Sheet 2

INVENTORS.
JAMES W. FITZGERALD
EDWIN J. PARSSINEN
NORMAN SEROTTA
JOHN F. WHITE
By Max A. Farmer
ATTORNEYS.

United States Patent Office 3,277,436
Patented Oct. 4, 1966

3,277,436
HOLLOW ELECTRO-ACOUSTIC TRANSDUCER
James W. Fitzgerald, Shadyside, Md., and Edwin J. Parssinen, Mystic, and Norman Serotta and John F. White, New London, Conn., assignors to the United States of of America as represented by the Secretary of the Navy
Filed Feb. 9, 1956, Ser. No. 564,587
5 Claims. (Cl. 340—10)

The invention described herein may be manufactured and used by or for the Government of the United States of America for governmental purposes without the payment of any royalties thereon or therefor.

This invention relates to electro-acoustic transducers and more particularly it relates to a device which is reversible in that it may be used to convert acoustic energy to electrical energy and vice versa in the reception and transmission of mechanical waves.

There are many well known materials which can be employed as vibrating elements in electro-acoustic transducers for converting acoustic to electric energy and vice versa. Such materials may be ammonium dihydrogen phosphate, rochelle salts, etc. which have piezoelectric properties, nickel which has magnetostrictive properties and alkaline earth titanate ceramics which have electrostrictive properties.

Piezoelectric crystal type transducers are much more flexible than magnetostrictive transducers as to the frequency of the sound signal projected and received. Their wide frequency range makes them especially suited for receiving all sorts of underwater signals. However, piezoelectric crystal transducers are deficient in that they cannot be driven to put out as strong a beam as magnetostrictive type transducers. A piezoelectric crystal will break if too large a voltage is put across it while a nickel tube can put out many more times the power of a crystal without damage. On the other hand, in the case of magnetostrictive transducers, the magnetostrictive material usually has a natural frequency. Unless the signal voltage applied is substantially exactly the same as this natural frequency, their vibrational output will be so small in amplitude as to be practically useless. The electrostrictive materials such as the barium titanate and other alkaline earth titanate ceramics combine both the broad band frequency characteristics of piezoelectric crystals and the power characteristics of magnetostrictive materials.

In modern warfare, sonar systems capable of detecting and locating snorkling submarines at ranges greater than 10,000 yds. are needed. The lower audio frequencies, primarily because of lower propagation losses, offer the greatest possibility of successful direct listening at such ranges. However, to provide a sonar system capable of detecting and locating objects accurately at ranges greater than 10,000 yds., the transducer employed must have several necessary characteristics. First, it should possess sufficient mechanical strength to permit its utilization aboard surface vessels or submarines, and in fixed submerged arrays. Second, it should have relatively high sensitivity and low impedance. Third, it should have a relatively flattened response over a wide band of frequencies. Fourth, good acoustic isolation between active elements and the mounting structure should be provided. Fifth, there should be good acoustic isolation from a vibrating mounting platform.

It is accordingly the primary object of the present invention to provide an electro-acoustic transducer effectively utilizable in long range sonar detecting systems.

It is another object to provide an electro-acoustic transducer having relatively high sensitivity, low impedance, a relatively flat response over a wide band of frequencies, and necessary mechanical strength for sonar installations.

It is another object to provide an electro-acoustic transducer wherein there is provided good acoustical isolation between active elements and between active elements and the mounting structure.

It is still another object to provide an electro-acoustic transducer wherein there is provided good acoustic isolation from a vibrating mounting platform and wherein relatively few electrical connections are required between active elements.

In accordance with the present invention, there is provided an electro-acoustic transducer comprising an inner hollow strength member of cylindrical configuration consisting of a rigid material such as stainless steel. Disposed along the outer periphery of the strength member is a plurality of units arranged in seriatim. Each unit comprises a spacer which preferably consists of soft compliant rubber or corprene (a rubber bonded cork), a pair of spaced washers consisting of a resilient material such as rubber and having an outer diameter which is less than the outer diameter of the spacer, a spacing element having a diameter less than that of the spaced washer and disposed therebetween to maintain them in a given spaced relationship, the spacing element preferably consisting of a urea or phenol formaldehyde resin absorbed in a fibrous base such as the commercially known product sold under the trade name of "Formica," and a cylinder consisting of an electrostrictive material and having an inner diameter equal to the outer diameter of the washers, an outer diameter equal to the outer diameter of the spacer and a length equal to the length of the spacing element plus the thickness of both washers. The electrostrictive cylinder intimately engirdles the washers so that an air space is provided between the spacing element and the inner surface of the electrostrictive cylinder. One of the washers abuts the spacer and the other washer is in abutting contact with the spacer of the next unit. Electrostrictive materials which may be utilized are alkaline earth titanate ceramics such as barium titanate, barium titanate with admixtures of calcium titanate or lead titanate, and other alkaline earth titanates. One end of the hollow strength member is in firm contact with a rigid end piece such as brass, the end piece permitting ingress to the inner portion of the strength member of an electrical cable. The other end of the strength member may threadedly engage a second end piece. If desired, the complete device may be enclosed in a boot of sound transparent material which is impervious to the sound wave transmitting medium. The boot may consist of a rubber such as neoprene or other suitable material. Means for electrically connecting the barium electrostrictive cylinders is provided and comprises a first wire passing through the washers, spacers and air spaces and having short wire solder contacts with the inner surface of the electrostrictive cylinders and a second wire having soldered contacts to the outer surfaces of the cylinders. Both wires enter the interior of the hollow strength member through insulated bushings provided through the walls thereof and are there connected to the connectors respectively of an electrical cable.

The salient feature of the present invention is the mounting of relatively brittle electrostrictive cylinders to achieve mechanical strength without impairing the acoustical properties thereof. The cylinder mounting provides pressure release of the electrostrictive cylinders with air on the inner surface and at the same time it provides the ability to withstand pressures of the transmitting medium such as hydrostatic pressures of more than 200 lbs. per square inch.

Other objects and many of the attendant advantages of this invention will be readily appreciated as the same becomes better understood by reference to the following detailed description when considered in connection with the accompanying drawing wherein.

Figure 1:
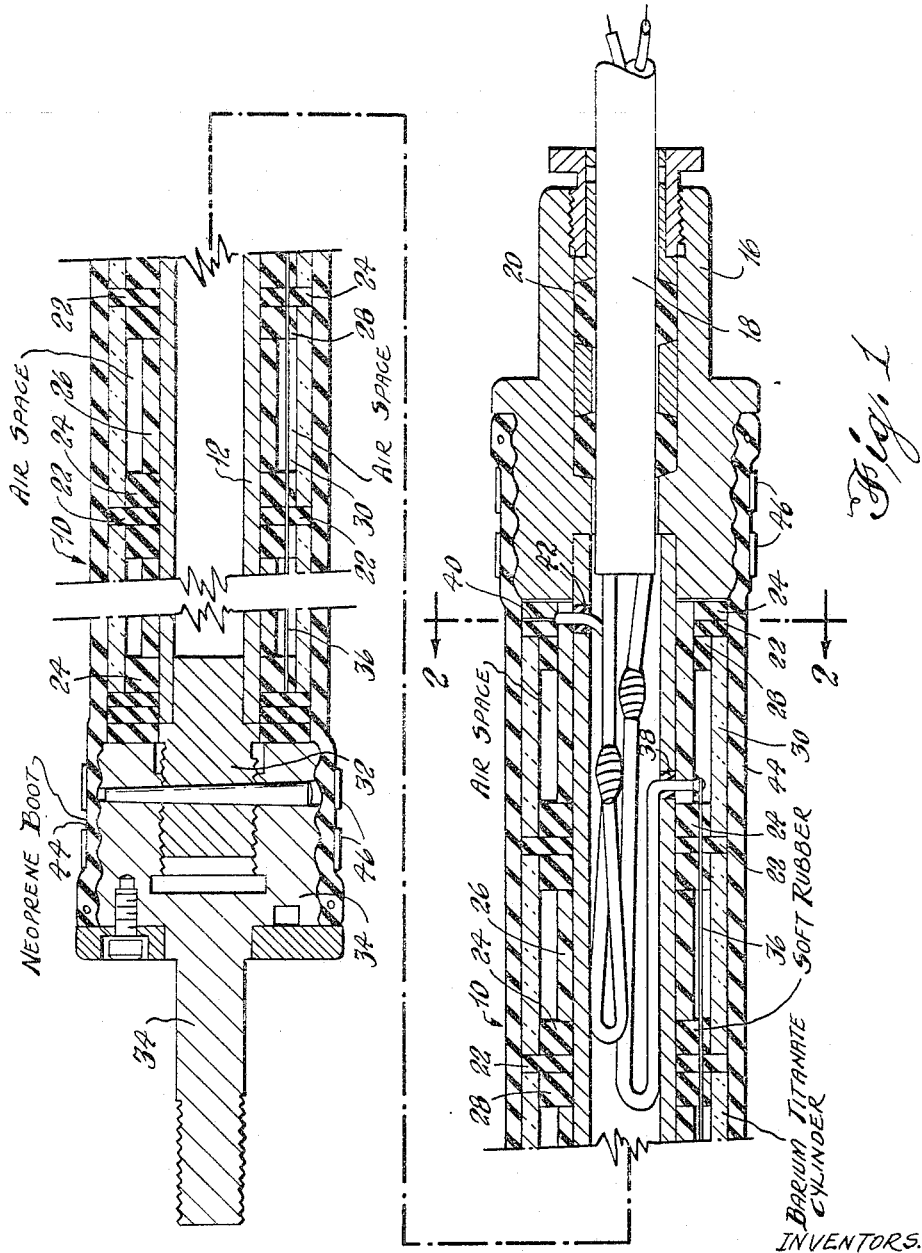
FIG. 1 is a section of a preferred embodiment of the invention.

Referring now more particularly to FIG. 1, the transducer assembly 10 comprises a hollow strength member 12 which may include a strong metal, preferably stainless steel. In one embodiment, tube 12 may have an outer diameter of about ¾ inch and a ⅛-inch thickness. Tube 12 is affixed at one end 14 by welding or other suitable means to a brass end piece 16 substantially as shown. End piece 16 has an inner bore therethrough and when affixed to tube 12 its inner bore is substantially continuous with the interior of the tube 12. A cable 18 is received within the bore of end piece 16 extending into the interior of tube 12. To insure that the outside medium such as water does not enter through the bore, the end portion of end piece 16 has an enlarged inner diameter to accommodate a cable stuffing gland 20 and suitable washers and seals associated therewith. Engirdling the outer periphery of tube 12 are a plurality of units arranged in seriatim. Each of the units comprises a spacer consisting of a soft resilient material such as rubber or corprene, corprene being a rubber bonded cork. Spacers 22 have an inner diameter equal to the outer diameter of tube 12 and a chosen outer diameter as will be explained further hereinbelow. Abutting against a spacer is a first washer 24 which consists of a resilient material such as rubber and having an inner diameter equal to the outer diameter of tube 12 and an outer diameter which is less than that of the spacer 22. Abutting against washer 24 is a cylindrical spacing element 26 which preferably consists of a strong synthetic resin such as a urea or phenol-formaldehyde resin absorbed in a fibrous base of which the commercially known product "Formica" is an example. Spacing element 26 has an inner diameter equal to the outer diameter of tube 12 and an outer diameter which is less than that of washer 24. A second washer 28 which is similar to first washer 24 has one face abutting against the other end of spacing element 26 and abuts on its other face against the spacer 22 of the next unit, spacing element 26 serving to keep the units apart a given distance. An active element 30 preferably consisting of an electrostrictive material and having an inner diameter equal to the outer diameter of washers 24 and 28 and an outer diameter equal to the outer diameter of spacers 22 and a length equal to the length of spacing element 26 plus the thicknesses of washers 24 and 28 intimately engirdles washers 24 and 28 whereby an air space is provided between the intermediate portion of the inner surface of element 30 and the outer surface of spacing element 26. The other end of tube 12 is suitably affixed to a threaded member 32 by soldering or welding, element 32 being adapted to threadedly engage an end piece 34. Completely surrounding the assembly between end pieces 16 and 34 is a boot 44 which is transparent to sound but impervious to transmitting media. Boot 44 preferably consists of a neoprene rubber or other like material. Cylinders 30 preferably consist of barium titanate in the polarized electrostrictive state but may also consist of other suitable materials such as barium titanate with admixtures of calcium titanate or lead titanate or may consist of other alkaline earth titanates. Electrode coatings 30a on the inner and outer surfaces of cylinders 30 are provided by firing them with silver.

Figure 3:
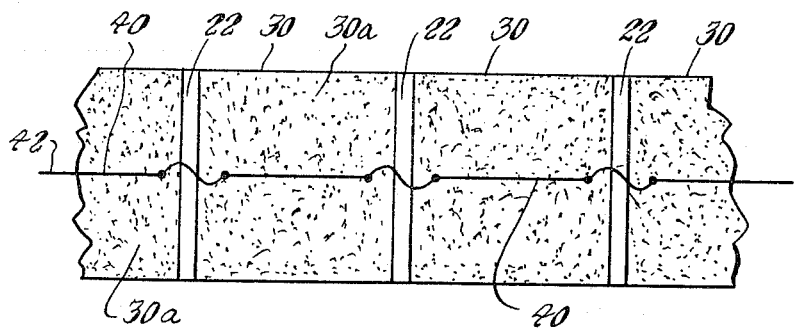
FIG. 3 is a view of a portion of the outer surface of several active elements of the embodiment of FIG. 1 which shows the electrical connection to such surface.

To provide electrical connection between the inner surfaces of electrostrictive cylinders 30 and electrical cable 18, a wire 36 is run through the rubber washers 24 and 28 and spacers 22 as shown and short wires (not shown) are soldered to this wire and to the inside electrode of each electrostrictive cylinder 30. Wire 36 enters the interior of tube 12 near the end of one conductor of cable 18 by way of an insulated bushing 38. The outside surfaces of electrostrictive cylinders 30 are connected by a strapping wire 40 which is soldered to each cylinder preferably in two places as shown in FIG. 3. Wire 40 is also brought through the wall of tube 12 by means of an insulating bushing 42. Wire 40 which lies between the inner surface of boot 44 and the outer surfaces of cylinders 30 and spacers 22 may be brought from the outer surface of cylinders 30 between the two spacers abutting end piece 16 to a second conductor of cable 18. Since wire 40 cannot be seen in FIG. 1, numeral 40 indicates the point where it reaches the conductor.

Figure 2:
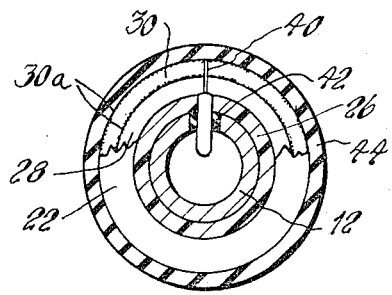
FIG. 2 is a section taken along line 2—2 of FIG. 1 looking in the direction of the arrows.

In FIG. 2, it is shown how wire 40 is brought to the conductor of cable 18 through bushing 42. In the interest of clarity, spacer 22, washer 28 and portions of cable 18 have been omitted.

To assemble the transducer, tube 12 is preferably first welded to brass end piece 16. The units are assembled by sliding consecutively onto the outer periphery of tube 12 a spacer 22, a washer 24, a "Formica" cylinder 26, and another washer 28. A barium titanate 30 or other electrostrictive cylinder is then placed around the washers 24 and 28. This operation is repeated until a sufficient amount of electrostrictive cylinders 30, say about 20, are in position. After cylinders 30 are firmly clamped, end piece 34 is screwed on and pinned as shown in FIG. 1. Cable 18 is inserted into the bore of end piece 16 extending a small amount into the interior of tube 12. Soldered connections are made between the inner wall of cylinders 30 and wire 36 and the outer walls of cylinders 30 and wire 40. The cable is connected to wires 36 and 40 and the cable stuffing gland 20 is inserted in end piece 16. A neoprene boot 44 which may be of molded ⅛-inch stock and preferably has an inside diameter of about ⅒ inch less than the outside diameters of cylinders 30 is installed by expanding it in a vacuum jig, wetting the inside of the boot and the transducer 10 assembly with warm castor oil and sliding the assembly into the boot. When the vacuum is released, the boot collapses onto the outer periphery of the surface with a hoop tension of approximately several pounds per inch such as about 6 pounds. The castor oil is milked from the interface of the inner surface of the boot and the outer surface of the transducer assembly 10 by stroking the boot from the center to the ends without twisting and suitable clamps 46 are installed around the boot. A completed transducer assembly 10 with 20 cylinders may be about 2 inches in diameter over the end pieces and 3 feet in length and have active electrostrictive surface 1¾ inches in diameter and 32⅜ inches. Without cable, the assembly may weight about 10 pounds.

It is readily seen that the use of the stainless steel or other strong hollow member 12 in the present invention imparts great mechanical strength thereto thus enabling its utilization aboard surface vessels, submarines and in fixed submerged arrays. Since waves breaking across hydrophones or water submerged transducers impose severe impact loads, which might shatter the barium titanate cylinders 30, the present invention was tested by dropping into water from various heights. No effects were noted even after falls from a 35 foot height, which corresponds to a water-entry velocity of approximately 30 m.p.h. The invention has also been tested as to its resistance to hydrostatic pressures and has withstood pressures in excess of 200 pounds p.s.i. without any noticeable effect.

The soft compliant rubber spacer 22 provides good acoustic isolation between the cylinders and the arrangement of the "Formica" stabilizing cylinder between support washers 24 and 28 to provide the air space between the inner surface of cylinder 30 and spacing element 26 results in the prevention of the traveling of sound waves through the interior of the cylinder 30 and impinging on the inside surface of the opposite wall. The invention also has a relatively high sensitivity and low impedance and a relatively flat response over a wide band of frequencies such as from about 100 cycles to 40 kilocycles. Due to the seriatim arrangement of active units, it readily lends itself to mass production techniques.

There are several alternate methods which may be utilized for constructing the present invention. For example, the cylinders 30 may be electrically connected in any series-parallel combination. For a given number of cylinders, the sensitivity can be increased by connecting some or all of the cylinders in series; this however will cause a rise in impedance and the hydrophone loss, a figure of merit for receiving transducers, remains the same. Individual wire leads can be brought from the inside and the outside electrodes of each cylinder 30. In this manner, each cylinder may be operated separately. The device may be constructed in any length. The number of cylinders used in a given length can be varied, depending upon the desired frequency range and impedance. Cylinders of other dimensions can also be used, but it is to be understood that the resonant frequency and other characteristics vary with physical dimensions. A workable device can be constructed in the manner described without boot 44. The electrostrictive cylinders 30 may also be mounted inside of thin-walled metal tubes or cast in a plastic.

Obviously, many modifications and variations of the present invention are possible in the light of the above teachings. It is therefore to be understood that within the scope of the appended claims the invention may be practiced otherwise than as specifically described.

We claim:

1. An electro-acoustic transducer comprising an elongated hollow strength member, an end piece secured to each end of said member and having a portion of greater diameter than said member to provide a shoulder flange at each end of said member, a plurality of spacers of soft, resilient material fitted over said member and spaced apart therealong, and the two end spacers abutting adjacent said shoulders, a plurality of washers of soft resilient material also fitted over said member, one abutting each end spacer at the sides thereof opposite from said shoulders, and one against each face of the spacers that are between the end spacers, a plurality of sleeves of insulating material fitting said strength member and disposed one between each pair of washers that are located between two spacers, said washers being of smaller outside diameter than said spacers and said sleeves having a smaller external diameter than said washers, a plurality of cylinders of electrostrictive material electroded on their inner and outer peripheral surfaces, surrounding said member, and arranged one in the space between each two adjacent spacers and abutting endwise against the spacers, the outside diameter of each cylinder being substantially equal to the outside diameters of the spacers and the inside diameter of each cylinder being substantially equal to the outside diameter of said washers, with the cylinder ends telescoping snugly over the washer outer peripheries, a boot of elastic sound transparent material fitted over said member and the washers, spacers and cylinders mounted thereon, and at its ends closely fitting and telescoping to some material extent over said end pieces, and conductors entering and passing endwise through one of said end pieces through a watertight seal into said member then through the wall of said member and there connected one to the inner electroded surface of the cylinders and the other to the outer electroded surfaces of the cylinders, the space between the inner surface of a cylinder and the outer surface of the sleeve over which it extends and the passage in said hollow member being air spaces.

2. The transducer as set forth in claim 1 wherein said electrostrictive material is an alkaline earth titanate ceramic material.

3. The transducer as set forth in claim 1 wherein one of said conductors passes through said spacers and washers and along the air spaces between the cylinders and sleeves.

4. An electro-acoustic transducer comprising an elongated hollow strength member, end pieces secured to and closing the ends of said member, a plurality of cylinders of electrostrictive material of materially greater internal diameter than the external diameter of said member, disposed concentric with said member and spaced apart in tandem thereon, elements of resilient material on said member and interposed between said cylinders, and between said cylinders and said member for spacing said cylinders apart, end to end, and also for holding said cylinders in spaced relation to said member, and thus providing an air space between the cylinders and member, said cylinders having electroded inner and outer surfaces, conductors entering said member from one end portion thereof through a watertight seal and passing along within said member, then passing through the side of said member and connected to said electroded surfaces of said cylinders, and a boot of elastic sound transparent water impervious material fitted snugly over said cylinders and member and forming a watertight seal with said end pieces.

5. An electro-acoustic transducer comprising an elongated strength member having enlarged diameter ends, a plurality of cylinders of electrostrictive material of materially greater internal diameter than the external diameter of said member between said ends, disposed approximately concentrically with and around said member, but spaced from said member and also spaced apart in tandem thereon, said cylinders having electroded inner and outer peripheral surfaces, soft resilient material on said member and spacing said cylinders apart endwise and each cylinder from said member, with the major part of the inner periphery of each cylinder exposed and out of contact with said spacing material and said member, a boot of elastic, sound transparent, water impervious material fitted snugly over and in contact with said cylinders and enlarged ends of said members, and forming with said ends, a watertight envelope around said cylinders, and means having a watertight entrance through said envelope for establishing circuit connections to the inner and outer electroded peripheral surfaces of said cylinders.

References Cited by the Examiner

UNITED STATES PATENTS

| | | | |
|---|---|---|---|
| 2,732,536 | 1/1956 | Miller | 340—10 |
| 2,749,532 | 6/1956 | Harris | 340—11 |
| 2,804,603 | 8/1957 | Harris | 340—11 |
| 2,837,731 | 6/1958 | Harris | 340—8 X |

CHESTER L. JUSTUS, *Primary Examiner.*

NORMAN H. EVANS, FREDERICK M. STRADER,
*Examiners.*

P. H. BLAUSTEIN, C. F. ROBERTS, J. P. MORRIS,
*Assistant Examiners.*